2,812,362
PREPARATION OF BIS(CHLOROPHENYL)-TRICHLOROETHANOL

Harold F. Wilson, Moorestown, N. J., and Edward L. Wolffe, Willow Grove, Pa., assignors to Rohm & Haas Company, Philadelphia, Pa., a corporation of Delaware No Drawing. Application October 12, 1955, Serial No. 540,155

7 Claims. (Cl. 260—618)

This invention deals with a process for preparing 1,1-bis(chlorophenyl)-2,2,2-trichloroethanols, which are valuable pesticidal agents. These compounds have the formula

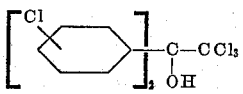

It had been found that these compounds could be made by reacting a 1,1-bis(chlorophenyl)-1,2,2,2-tetrachloroethane with aqueous formic or with aqueous acetic acid plus a little sulfuric acid. Previously reported reactions of 1,1-bis(chlorophenyl)-1,2,2,2-tetrachloroethanes showed that with ferric chloride the compound

for example, was formed, while strong sulfuric acid and water caused the formation of 4,4'-dichlorobenzil.

We have now found that when a 1,1-bis(chlorophenyl)-1,2,2,2-tetrachloroethane is heated with water and a sulfonic acid, usually an arylsulfonic acid or an alkanesulfonic acid, together with a definite proportion of sulfuric acid at temperatures between 125° and 165° C., there is relatively rapidly formed a 1,1-bis(chlorophenyl)-2,2,2-trichloroethanol in good yield at a good level of purity. Hydrogen chloride is evolved during the reaction.

The ratio of the weight of sulfonic and sulfuric acids together to the weight of 1,1-bis(chlorophenyl)-1,2,2,2-tetrachloroethane in the initial reaction mixture may vary from 0.05:1 to 2:1, although with a ratio below 0.1:1 reaction is slow although positive. Hence, 0.1:1 is a preferred lower limit with 1:1 being an economical upper limit, while the most effective and efficient ratios are from 0.2:1 to about 0.5:1, reaction then being rapidly promoted with minimum formation of by-products.

The ratio of sulfonic acid to sulfuric acid may vary from about 99.5:0.5 to about 47:53 by weight on the basis of these acids themselves. The preferred ratios are 99.3:0.7 to 85:15. Since they usually contain some water and since they are generally diluted with some water either during mixing or prior to mixing with the 1,1-bis(chlorophenyl)-1,2,2,2-tetrachloroethane, it is more convenient within the preferred ratios to define the initial acid mixture as containing 70 to 85 parts by weight of sulfonic acid, 0.5 to 15 parts of sulfuric acid, and 14.5 to 29.5 parts of water, the total parts being 100. For the broadest proportions the acid mixture may contain about 35 to 85 parts of a sulfonic acid, about 0.5 to 39 parts of sulfuric acid, and about 14.5 to 30 parts of water. Such ratios are in general maintained during the reaction although the ratio of acids to 1,1-bis(chlorophenyl)-1,2,2,2-tetrachloroethane must necessarily vary as reaction proceeds.

The ratios of sulfonic acid to sulfuric acid and of sulfonic acid to sulfuric acid to water are selected with view to the temperature range within which it is desired to operate. As temperatures are raised, the reaction rate increases, but by-products tend to appear, although not in any troublesome proportions within the recited temperature range. As relatively higher temperatures of reaction are employed, the proportion of sulfuric acid is desirably diminished within the ranges set forth above. Also as temperatures are increased, less water will be present in the reaction mixture. Water is added as needed to maintain the hydrolysis reaction and to hold the temperature at the desired level. If it is desired to use a relatively high proportion of sulfuric acid, then for good results somewhat more water should be used and the reaction will run in a relatively lower temperature range. For example, if the starting catalyst mixture contains about 35% of a sulfonic acid, 35% of sulfuric acid, and 30% of water, the reaction should be run between about 130° and 135° C. and be carefully controlled at about such temperatures with frequent additions of water.

Sulfonic acids with any hydrocarbon residue are effective. The commonest of these are arylsulfonic acids and alkanesulfonic acids. Typical arylsulfonic acids are benzenesulfonic, chlorobenzenesulfonic, any of the toluene sulfonic acids, chlorotoluenesulfonic, butylbenzenesulfonic, isopropylbenzenesulfonic, xylenesulfonic in any isomeric form or mixture thereof, α- or β-naphthalenesulfonic, isopropylnaphthalenesulfonic, butylnaphthalenesulfonic, anthracenesulfonic, 1,5- or 2,6-naphthalenedisulfonic, 1,4-dimethylnaphthalene-2-sulfonic, 4-methylnapthalene-1- or -2-sulfonic, or comparable aromatic sulfonic acids. Alkanesulfonic acids include commercial mixtures of or the individual lower alkanesulfonics, such as methane-, ethane-, propane-, or butanesulfonic acids, or octanesulfonic, or decanesulfonic. As prepared, these acids normally contain a small amount of sulfuric acid. This is taken into consideration in calculating the ratio of sulfonic acid to sulfuric acid. Sometimes it may not be necessary to add sulfuric acid, as sufficient may already be present. If analysis shows sulfuric acid to be lower than at the level desired, it is then added within the designated limits.

Excess sulfuric acid causes a reduced yield of desired product and as amounts of sulfuric acid increase, production of dichlorobenzil progresses. On the other hand carefully purified sulfonic acids essentially free of sulfuric acid promote formation of tars under some conditions. In some cases it has been observed with purified sulfonic acids that no reaction occurs at first. As heating continues, reaction begins and this has been traced to decompositions, usually giving some tars, sulfuric acid being formed, and permitting the desired type of reaction to then proceed.

Since water is consumed in the reaction, it becomes necessary to supply water as the reaction progresses. This may be done intermittently or continuously at a rate to compensate for its consumption. The proper amount of water to be added can readily be determined from the temperature at which the reaction mixture refluxes or is maintained. In general water is added to the reaction mixture to maintain the temperature thereof between about 125° and 165° C., preferably between 135° and 150° C. Temperature is also controlled by the amount of heat supplied. While rate of reaction increases rapidly as the temperature is raised, side reaction may increase, depending partly on the particular catalyst composition, until above 160–165° C., considerable benzil and tar appear as the reaction continues.

Under average conditions the conversion of a 1,1-bis(chlorophenyl)-1,2,2,2-tetrachloroethane to a 1,1-bis(chlorophenyl)-2,2,2-trichloroethanol requires two to twenty hours, depending on temperature and ratio of catalyst used.

As starting materials, there are taken any of the 1,1-bis(chlorophenyl)-1,2,2,2-tetrachloroethanes. The usual products will have chiefly para substituted phenyl groups but ortho substituted and mixed para-ortho' products are also useful. Furthermore, the phenyl groups may also contain a methyl substituent.

As is known, the bis(chlorophenyl)tetrachloroethanes are prepared from 1,1-bis(chlorophenyl)-2,2,2-trichloroethanes. These may be chlorinated directly, preferably in the presence of a free radical catalyst, including light. An organic peroxide, such as benzoyl peroxide, or an azo catalyst, such as azodiisobutyronitrile or dimethyl azodiisobutyrate, speeds up the chlorination considerably.

In another procedure a 1,1-bis(chlorophenyl)-2,2,2-trichloroethane is dehydrohalogenated with alkali to give a corresponding bis(chlorophenyl)dichloroethylene, which is then chlorinated to the tetrachloroethane.

The process of this invention is conveniently carried out by charging a 1,1-bis(chlorophenyl)-1,2,2,2-tetrachloroethane to an acid-resistant reaction vessel, where it is heated to give a melt (70° to 100° C.). There is then added water, sulfonic acid, and sulfuric acid, either separately or in combination. Generally, it is desirable to add water first and then the mixture of sulfonic and sulfuric acids. Heat is evolved during the addition. The reaction mixture is now heated to a temperature of about 125° C. or more and best to a temperature at which reflux occurs.

In one way of proceeding the temperature is held at about a desired level by injecting water in required amounts to maintain approximately a constant temperature of reflux. As water is consumed by the reaction, the temperature tends to rise. Water is then supplied in an amount to hold the temperature in about the desired operating range.

In another way of proceeding the temperature is allowed to vary and the evolution of hydrogen chloride is maintained about constant with addition of water as required. The reaction mixture here may again be heated at reflux temperatures, and these are permitted to increase, although not above the practical limits shown above. Water is supplied at the rate needed to maintain evolution of hydrogen chloride at a nearly uniform rate until the starting material has essentially been converted.

When the reaction is fairly complete, as is indicated by a low rate or a cessation of evolution of hydrogen chloride, the reaction mixture is cooled below about 100° C., a range of 90°–100° C. being suitable, a water-immiscible, inert organic solvent, such as a low boiling naphtha or toluene or xylene or a chlorinated hydrocarbon, for example ethylene dichloride, is added along with water. An organic layer and an aqueous acid layer are allowed to form and are separated. The organic layer is washed with an aqueous alkaline solution, such as a dilute solution of sodium or potassium carbonate or sodium bicarbonate. The organic layer is then washed with water or with an aqueous salt solution to improve ease of separation. The organic layer is then taken and freed of solvent by distilling it off, desirably under reduced pressure, to give a residue which is chiefly the desired 1,1-bis(chlorophenyl)-2,2,2-trichloroethanol. This product can be used in the form thus obtained.

It may be further purified, if so desired, as by charcoaling, or extracting or by crystallizing out the trace of benzil which is sometimes present. This may be done by taking a dilute naphtha solution of the crude product, chilling it to about 0° C., where it is held for 12 to 18 hours while crystals form, and filtering off these crystals. Yields of 1,1-bis(chlorophenyl)-2,2,2-trichloroethanols of 90% to 95% can generally be obtained.

Under conditions of very careful working, particularly with preparation of a concentrated solution in a solvent, seeding, reduction of temperature, and stirring continuously for a long time, many of the reaction products can be obtained in crystalline form.

Further details of the process of this invention are given in the following examples which are presented by way of illustration and not limitation. Parts shown are by weight unless otherwise designated.

Example 1

There was charged to a reactor equipped with stirrer, reflux condenser, device for feeding water, and absorber containing sodium hydroxide solution for taking up hydrogen chloride 500 parts of 1,1-bis(chlorophenyl)-1,2,2,2-tetrachloroethane made from commercial 1,1-bis(chlorophenyl)-2,2,2-trichloroethane. This was heated to about 80° C. There was then added 132.5 parts of a mixture consisting of 94.1 parts of p-toluenesulfonic acid, 12.3 parts of sulfuric acid, and 26.1 parts of water. The resulting mixture was heated over a period of eight minutes to 143° C., at which temperature reflux occurred. When the temperature of the reaction mixture under reflux started to rise, a portion of 14.5 parts of water was added. Heating was continued for 300 minutes with frequent small additions of water to maintain the temperature of the mixture at 143°–145° C. During this time there was absorbed 96% of the amount of hydrogen chloride which was calculated to be evolved. The reaction mixture at this point was cooled to 100° C. and treated with 450 parts of octane and 50 parts of water. This mixture was stirred thoroughly and then allowed to form layers. The lower acid layer was drawn off and the upper organic layer washed, first with 250 parts of aqueous 10% sodium carbonate solution and then with three 250 part portions of aqueous 15% sodium chloride solution, the salt being used to aid in separating layers. The organic layer was then placed under reduced pressure and heated to a final temperature of 94° C. at 20 mm. pressure to remove the octane and yield 469 parts of oily residue, which by analysis was found to contain 85% of 1,1-bis(chlorophenyl)-2,2,2-trichloroethanol. This crude product was found to be satisfactory as a miticide requiring no further purification for this purpose.

Example 2

The reactor described above was charged with 500 parts of 1,1-bis(chlorophenyl)-1,2,2,2-tetrachloroethane, which was heated to about 80° C. There were then added 29 parts of water, 12 parts of 96% sulfuric acid, and 98.5 parts of commercial p-toluenesulfonic acid, which consisted of 95.5% of the toluenesulfonic acid, 0.8% of sulfuric acid, and the balance water. The temperature rose to about 100° C. and the mixture was heated to 140° C., at which point reflux began. About two parts of water were taken off as distillate. Evolution of hydrogen chloride then began. This was absorbed in caustic soda solution and the course of the reaction was followed by the absorption of this substance. The reaction mixture was heated at a rate to maintain an approximately constant evolution of hydrogen chloride, the temperature of the reaction mixture steadily rising to 147° C. after six hours. During this time there were made occasional additions of small portions of water to a total of 14.5 parts. The hydrogen chloride absorbed amounted to 104% of theory. The reaction mixture was cooled below 100° C. and treated in the same way as in Example 1. The oily residue obtained amounted to 456 parts. By analysis it contained 88% of 1.1-bis(chlorophenyl)-2,2,2-trichloroethanol.

This product was taken up in excess low boiling naphtha and this solution was chilled to about 0° C. for 18 hours. A small amount of crystalline material had then separated. This was filtered off. It consisted of benzil, in an amount of about two parts by weight. Either the residue as obtained or the residue freed of benzil are satisfactory for use as miticidal agents.

When 1,1-bis(chlorophenyl)-2,2,2-trichloroethanol is dissolved in a minimum amount of an alkane, such as hexane, octane, or decane, and this solution is cooled below 20° C., and stirred for several hours, pure product can be crystallized out. The crystals are separated by filtering and washed with an alkane solvent which has been chilled well below 0° C., as —40° C. The pure bis-(para-chlorophenyl)-2,2,2-trichloroethanol melts at 76°–77° C. while the isomer having one p-chlorophenyl group and an o-chlorophenyl group melts at 124°–126° C. The various isomers are readily obtainable by the above described procedures, starting with the corresponding 1,1-bis(chlorophenyl)-1,2,2,2-tetrachloroethanes.

While either the crude product obtained as an oil or the purified crystalline materials can be used as exceptionally effective miticides, the crystalline products have the advantage of giving dry wettable powders up to 75% active material.

Example 3

The procedure of Example 2 was followed starting with 500 parts of 1,1-bis(4-chlorophenyl)-1,2,2,2-tetrachloroethane which had been made from pure 1,1-bis(4-chlorophenyl)-2,2,2-trichloroethane. The theoretical amount of hydrogen chloride was absorbed in about 5.5 hours. The product was obtained as an oily residue which contained by analysis 95.6% of 1,1-bis(4-chlorophenyl)-2,2,2-trichloroethanol, 1.5% of starting material, 0.86% of benzil, and 0.3% of 1,1-bis(chlorophenyl)-2,2-dichloroethylene.

Example 4

To a reaction vessel there was charged 100 parts of 1,1-bis(4-chlorophenyl)-1,2,2,2-tetrachloroethane, which was heated above 70° C. and then was added 100 parts of a mixture consisting of 71 parts of toluenesulfonic acid, 3.1 parts of sulfuric acid, and 25.9 parts of water. The mixture was heated, reflux beginning at about 135° C. Evolution of hydrogen chloride was rapid. In 2.5 hours the theoretical amount thereof had been taken off with the temperature being allowed to rise to about 160° C. The reaction mixture was cooled below 100° C. and treated with water and toluene. The layers then formed were separated. The organic layer was washed with aqueous 5% sodium bicarbonate solution, then with aqueous 10% sodium chloride solution, and with water. Toluene was distilled off to give an oily residue which was 92% pure 1,1-bis(4-chlorophenyl)-2,2,2,-trichloroethanol.

Example 5

To the reactor there was charged 100 parts of 1,1-bis(chlorophenyl)-1,2,2,2-tetrachloroethane made from commercial 1,1-bis(chlorophenyl)-2,2,2-trichloroethane. This was heated until it melted, whereupon was added 4 parts of water followed by 20 parts of a butanesulfonic acid containing five percent sulfuric acid and by 2.4 parts of 98% sulfuric acid. This reaction mixture was heated to about 145° C., where there was reflux with evolution of hydrogen chloride. Small increments of water were frequently injected to hold the reflux temperature between 142° and 149° C. until the theoretical evolution of hydrogen chloride was approached (about four hours). At this point the mixture was cooled below 100° C. and treated with 50 parts of water and 100 parts of a close-cut naphtha. The organic layer was separated, washed with aqueous 10% sodium carbonate solution, and washed with aqueous 15% sodium chloride solution. The naphtha was distilled from the washed organic layer and the product obtained was over 75% pure 1,1-bis(chlorophenyl)-2,2,2-trichloroethanol. A trace of the benzil was removed by the procedure described above and the product crystallized after seeding. The product was pure 1,1-bis(4-chlorophenyl)-2,2,2-trichloroethanol in a yield of 60%. By evaporation of solvent addition crops of crystalline material can be obtained.

Example 6

The procedure of Example 5 was followed with substitution of a commercial mixture of alkane sulfonic acids (chiefly ethyl sulfonic) for the butanesulfonic acid. Results were practically identical.

There may similarly be used any of the alkanesulfonic acids from one to 12 or more carbon atoms with like results.

Example 7

The procedure of Example 2 was repeated with substitution of naphthalenesulfonic acid for the toluenesulfonic acid. The theoretical evolution of hydrogen chloride was obtained in about five hours at temperatures of 140°–150° C. Practically pure 1,1-bis(4-chlorophenyl)-2,2,2-trichloroethanol was obtained in a yield of over 80%.

Example 8

In place of naphthalenesulfonic acid as in Example 7, there was used xylenesulfonic acid. Time of reaction was 4.5 hours and the yield of pure product was 76%.

Example 9

The procedure of Example 2 was followed with substitution of 105 parts of chlorobenzenesulfonic acid for the p-toluenesulfonic acid. The reaction was carried on for about seven hours at 143°–147° C. The crude product obtained contained 79% of 1,1-bis(chlorophenyl)-2,2,2-trichloroethanol. It was highly effective as a miticide in carefully controlled biological evolution tests. The yield was 91%.

Example 10

The reactor described in Example 1 was charged with 500 parts of technical 1,1-bis(chlorophenyl)-1,2,2,2-tetrachloroethane, which was heated to about 80° C. There were added 54.8 parts of 96% sulfuric acid, 55.5 parts of commercial p-toluene sulfonic acid which consisted of 95.5% p-toluenesulfonic acid, 0.8% sulfuric acid, and the balance water, and 22.2 parts of water. The temperature rose to about 100° C. and the mixture was heated to 145° C. over a period of one half hour and held at this temperature by regulation of the heater. Hydrogen chloride was evolved and was absorbed in standard caustic solution and the amount evolved was continuously measured. Water at a mole per mole ratio to the hydrogen chloride evolved was added to the reacting mixture. A total of 19 parts of water were added over a 4 hour period. It was noted that control of temperature in this non-refluxing system was markedly more difficult than in the refluxing systems described in Examples 1 and 2.

The hydrogen chloride absorbed amounted to 105% of theory. The reaction mixture was cooled to below 110° C. and 400 parts of octane and 50 parts of water added. The lower acid layer was drawn off and the upper organic layer treated as in Example 1. There was obtained 450 parts of technical 1,1-bis(chlorophenyl)-2,2,2-trichloroethanol which by analysis was 71% pure.

We claim:

1. A process for preparing a 1,1-bis(chlorophenyl)-2,2,2-tricholorethanol which comprises mixing a 1,1-bis(chlorophenyl)-1,2,2,2-tetrachloroethane, a sulfonic acid from the class consisting of alkanesulfonic acids and arylsulfonic acids of not over 12 carbon atoms, sulfuric acid, and water, and heating the mixture at a temperature between about 125° C. and 165° C. with evolution of hydrogen chloride, the ratio of the said sulfonic acid to sulfuric acid being from about 99.5:0.5 to about 47:53 by weight, the ratio of the combined weights of the said sulfonic acid and sulfuric acid to the weight of the 1,1-bis(chlorophenyl)-1,2,2,2-tetrachloroethane used for the mixture being between 0.05:1 and 2:1, and the proportion of water being given by the ratios of parts by weight of the sulfonic acid to sulfuric acid to water of 35 to 85:0.5 to 39:14.5 to 30, the total parts making 100.

2. A process for preparing 1,1-bis(chlorophenyl)-2,2,2-trichlorethanol which comprises forming a mixture of 1,1-bis(chlorophenyl)-1,2,2,2-tetrachloroethane, a sulfonic acid from the class consisting of alkanesulfonic acids and arylsulfonic acids of not over 12 carbon atoms, sulfuric acid, and water, the ratio of the combined weights of the sulfonic and sulfuric acids to the weight of 1,1-bis(chlorophenyl)-1,2,2,2-tetrachloroethane being from 0.1:1 to 2:1 and the ratio of sulfonic acid to sulfuric acid being from 99.3:0.7 to 85:15, heating the said mixture to a refluxing temperature between about 125° and 165° C. with evolution of hydrogen chloride, and adding water to the refluxing mixture to maintain the temperature of reflux between 125° and 165° C. until about the theoretical amount of hydrogen chloride has been evolved.

3. A process according to claim 2 wherein the sulfonic acid is toluenesulfonic acid.

4. A process according to claim 2 wherein the sulfonic acid is naphthalenesulfonic acid.

5. A process according to claim 2 wherein the sulfonic acid is chlorobenzenesulfonic acid.

6. A process according to claim 2 wherein the sulfonic acid is ethylsulfonic acid.

7. A process for preparing 1,1-bis(4-chlorophenyl)-2,2,2-trichloroethanol which comprises mixing 1,1-bis(4-chlorophenyl)-1,2,2,2-tetrachloroethane, a sulfonic acid from the class consisting of alkanesulfonic acids and arylsulfonic acids of not over 12 carbon atoms, sulfuric acid, and water, heating the resulting mixture to a refluxing temperature between 135° and 150° C. with evolution of hydrogen chloride, and adding water to the refluxing mixture to maintain the reflux temperature between 135° and 150° C. until the theoretical amount of hydrogen chloride has been evolved, the ratio of the sulfonic acid to sulfuric acid being from about 99.3:0.7 to 85:15, by weight, the ratio of sulfonic and sulfuric acids taken together to 1,1-bis(4-chlorophenyl)-1,2,2,2-tetrachloroethane used to form the mixture being from about 0.2:1 to 0.5:1 by weight, and the water present being sufficient to provide the stated reflux temperatures.

References Cited in the file of this patent
UNITED STATES PATENTS
2,720,548    Craig et al. _____ Oct. 11, 1955